(12) United States Patent
Remillard

(10) Patent No.: US 7,420,173 B2
(45) Date of Patent: Sep. 2, 2008

(54) REFLECTIVE COLLIMATION OPTIC

(75) Inventor: Jeffrey Remillard, Ypsilanti, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 204 days.

(21) Appl. No.: 11/163,792

(22) Filed: Oct. 31, 2005

(65) Prior Publication Data

US 2007/0096026 A1    May 3, 2007

(51) Int. Cl.
G01J 5/02 (2006.01)
(52) U.S. Cl. ...................................... 250/353
(58) Field of Classification Search ............... 250/353; 359/196, 208, 212, 220, 223, 247
See application file for complete search history.

(56) References Cited

U.S. PATENT DOCUMENTS

| | | | |
|---|---|---|---|
| 4,625,115 A * | 11/1986 | Guscott | 250/353 |
| 5,002,347 A * | 3/1991 | Anderson et al. | 359/723 |
| 5,791,757 A | 8/1998 | O'Neil et al. | |
| 5,890,796 A | 4/1999 | Marinelli et al. | |
| 5,982,542 A | 11/1999 | Hannon et al. | |
| 6,036,340 A | 3/2000 | Fohl et al. | |
| 6,102,559 A | 8/2000 | Nold et al. | |
| 6,259,713 B1 | 7/2001 | Hwu et al. | |
| 6,337,841 B1 * | 1/2002 | Kim et al. | 369/112.06 |
| 6,422,713 B1 * | 7/2002 | Fohl et al. | 362/600 |
| 6,429,429 B1 | 8/2002 | Fohl et al. | |
| 6,456,437 B1 | 9/2002 | Lea et al. | |
| 6,774,367 B2 | 8/2004 | Stephan et al. | |
| 6,795,237 B1 | 9/2004 | Marinelli et al. | |
| 2002/0163483 A1 * | 11/2002 | Crist | 345/7 |
| 2003/0230715 A1 * | 12/2003 | Remillard et al. | 250/330 |
| 2004/0022051 A1 | 2/2004 | Weidel | |
| 2004/0027833 A1 * | 2/2004 | Amano et al. | 362/507 |
| 2004/0052280 A1 * | 3/2004 | Rice | 372/36 |

* cited by examiner

Primary Examiner—David P. Porta
Assistant Examiner—Kiho Kim
(74) Attorney, Agent, or Firm—Frank MacKenzie

(57) ABSTRACT

An optical system includes a light source 102 disposed for generating light preferably in a line. An optical element 104 includes a stepped reflecting surface 106 that includes reflecting surfaces 132 and step surfaces 130. The reflecting surfaces 132 have a metalized coating thereon so that the plurality of metalized reflecting surfaces reflect light therefrom. Each reflecting surface is a circular sector that increases in radius from an adjacent circular sector.

20 Claims, 3 Drawing Sheets

REFLECTIVE COLLIMATION OPTIC

TECHNICAL FIELD

The present invention is related to the field of reflective optics for automotive lighting applications, and more particularly, to optics suitable for exterior applications such as night vision systems.

BACKGROUND

Conventional lighting systems used in automotive vehicle applications such as headlights, taillights, and active night vision systems utilize an incandescent bulb with a reflector. The light emitted by the incandescent bulb is generally collimated by the reflector. The incandescent bulb may be used to generate light in the visible spectrum for headlight and taillight applications. Active night vision systems typically require near-infrared emissions that are compatible with solid state CCD or CMOS cameras to illuminate the scenery.

Advances in solid state lasers have given rise to thin-sheet lighting systems for use in taillight and active night vision systems. The thin-sheet systems require less space than bulb-and-reflector systems. Furthermore, laser diodes are more energy efficient and reliable than incandescent bulbs. A challenge in thin-sheet lighting systems is to rapidly spread the laser light over a sufficiently wide area to meet spatial illumination and eye safety requirements required under law. Many different approaches have been suggested to expand the point source of laser light uniformly over several square inches of an exterior optical surface.

U.S. Pat. No. 5,791,757, issued to O'Neil et al. on Aug. 11, 1998, discloses a lighting system that uses a uniform thickness thin-sheet optical element. This optical element has a plurality of micro-optical wedges that collimate and direct divergent laser light emitted from multiple fiber optic bundles. Diffractive optical elements are disposed intermediate the thin-sheet and fiber optics to direct the laser light to predetermined regions of the plurality of micro-optical wedges. The diffractive optical elements guide the light to the micro-optical wedges either in a direct path, or by bouncing the light off the exterior side of the thin-sheet opposite the micro-optical wedges. The optical efficiency of this approach could be improved upon if the diffractive optical element could be eliminated. Design complexity could be reduced if each of the micro-optical wedges did not have to be designed to receive the light from a different incident angle.

U.S. Pat. No. 6,422,713 describes a solid optical element that uses total internal reflection to reflect light from various facets. The light is projected into the optical element and projected outwardly by the facets. The optical element may be made of a plastic material. One drawback to this is that some plastic materials absorb light in the infrared range desirable for use in night vision illumination.

Therefore, it would be desirable to provide an optical structure that does not rely on internal reflection for distributing light in the infrared range.

SUMMARY

The present invention is a reflective optical element and a lighting system utilizing the reflective optical element and a method of manipulating light from a source to provide an illumination pattern suitable for use in a night vision system and exterior lighting applications.

Light emitted from the source has a naturally divergent emission pattern. A predetermined distance between the source and optical element is provided to allow the emission pattern to spatially expand prior to reaching the optical element where the reflecting surface is shaped as a circular sector to reflect light therefrom.

In one aspect of the invention, an optical structure includes a monolithic structure comprising a stepped surface. The stepped surface has a plurality of reflective surfaces and step surfaces. The reflecting surfaces have a metalized coating thereon so that only the plurality of metalized facets reflect light from a light source. Each reflecting surface is a circular sector. Each circular sector increases in radius from an adjacent circular sector.

In a further aspect of the invention, an optical system includes a light source disposed in a line and an optical element comprising a stepped surfaced. The stepped surface has a plurality of reflecting surfaces and step surfaces. The reflecting surfaces have a metalized coating thereon so that the plurality of metalized facets reflect light. Each reflecting surface is a circular sector. Each circular sector increases in radius from an adjacent circular sector.

In yet another aspect of the invention, a night vision system may include an infrared light source, an optical element as described above, a camera, and a display that receives the output of the camera.

One advantage of the invention is that inexpensive molding processes may be used to mold an inexpensive plastic part without the drawbacks of absorption in an internally reflected optical device.

These and other objects, features and advantages will be readily apparent upon consideration of the following detailed description in conjunction with the accompanying drawings.

DETAILED DESCRIPTION OF THE PREFERRED EMBODIMENT

Figure 1:
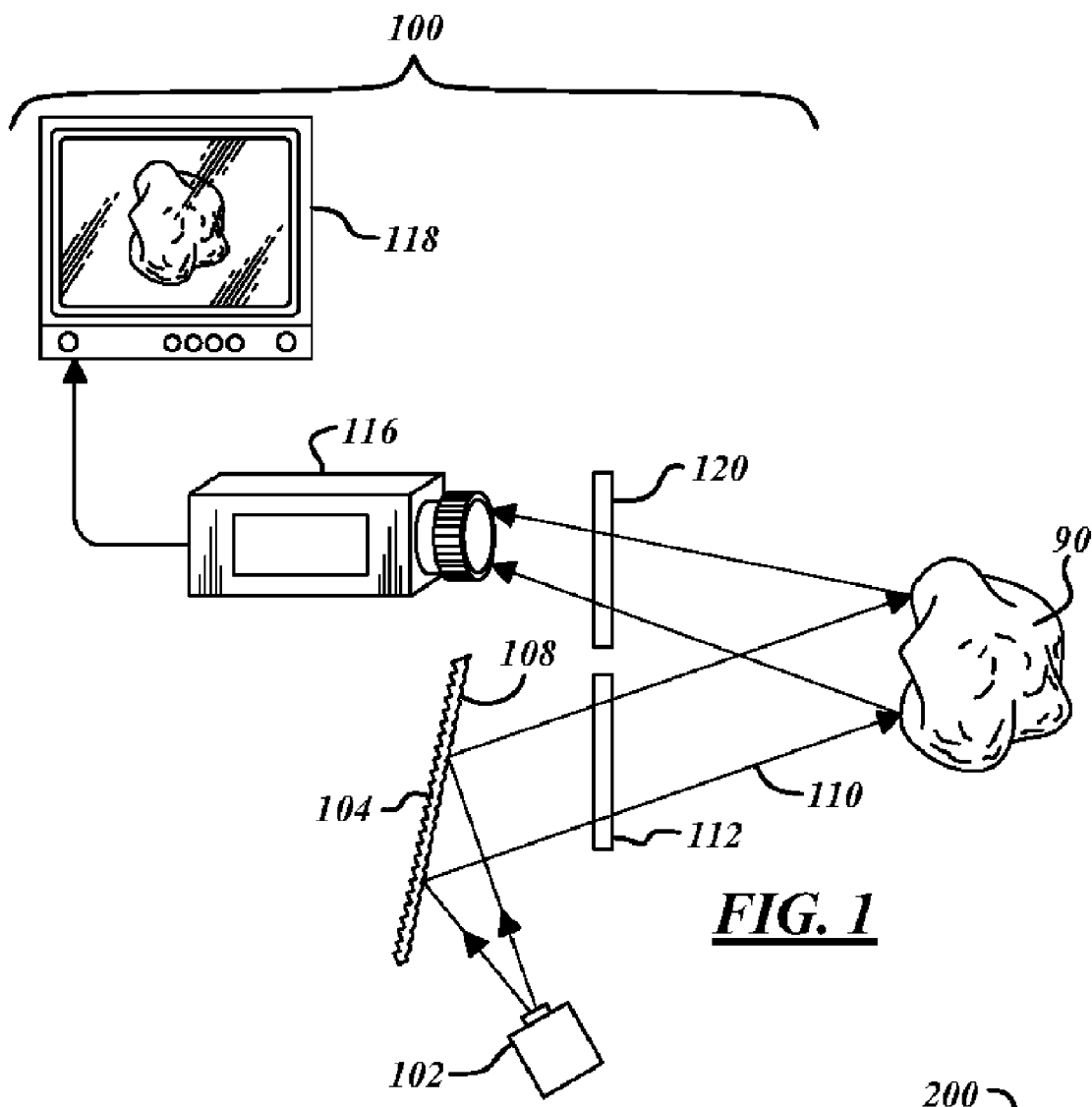
FIG. 1 is a diagram of the present invention utilized in an active night vision system.

In the following figures the same reference numerals will be used to illustrate the same components.

The present invention is described with respect to a night vision system that has an optical element used for collimating light. Those skilled in the art will recognize various other uses for the optical structures other than night vision systems including various lighting applications. Lighting applications may include interior and exterior automotive lighting applications. Also, an infrared light source is used to provide light for the night vision system. Other wavelengths of light suitable for various applications may also be employed.

FIG. 1 is illustrative of the present invention utilized in an active night vision system 100. A laser light source 102 is used to generate near-infrared light. An optical element 104 receives the light from the light source and reflects the light from a reflective surface 106. The optical element 104 is preferably a monolithic structure having the reflecting portions integrally formed therein. The light 110 is reflected on the outside of the optical element 104 from a metalized coating 108 disposed thereon.

A lens, diffuser, holographic plate, pillow optics, diffractive optics or any other optical device 112 may be positioned adjacent or adjoining the surface 106. This other optical device 112 manipulates the laser light to create a desired illumination pattern ahead of the night vision system 100. In one embodiment, the optical element 104 is designed to emit the desired illumination pattern by itself.

Landscaping, man made items, road surface, signs, animals, people and other objects 90 reflect the laser light back toward the night vision system 100. A camera 116 creates video images of the objects 90 illuminated by the laser light. The video images are displayed on a video display 118.

A narrow bandpass transmission filter 120 is typically placed before the camera 116. The narrow bandpass transmission filter 120 shields the camera 116 from bright sources of visible light such as on-coming headlights from other automobiles, streetlights, billboard lights, and the like.

Figure 2:
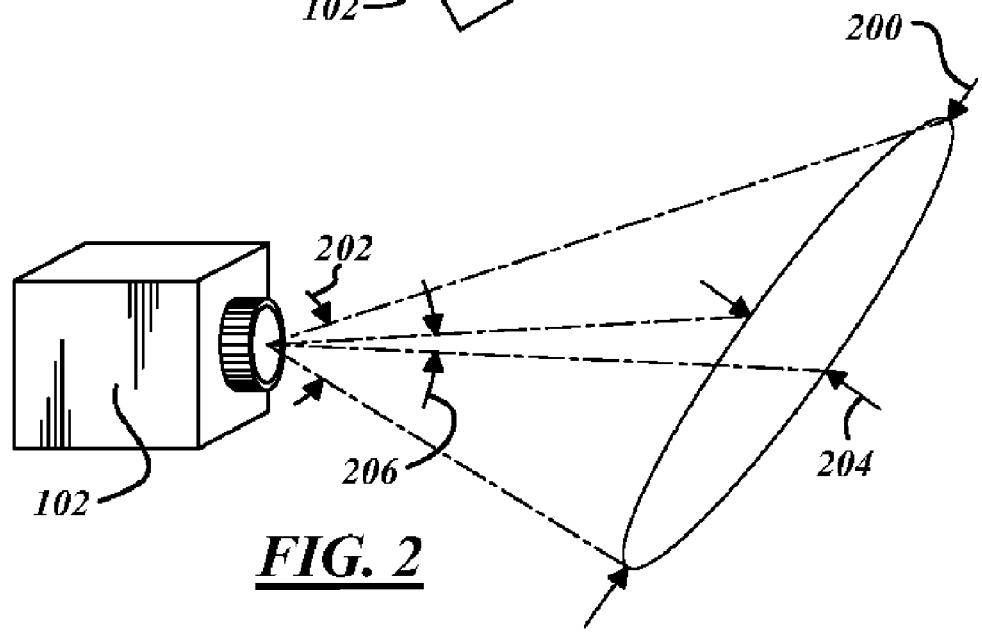
FIG. 2 is perspective view of an emission pattern of a laser diode.

Referring now to FIG. 2, a single laser is illustrated. The laser in an actual embodiment may be a line of discrete diodes or a linear array. Laser light emitted from a diode laser light source 102 usually has a fast axis 200 and a narrower slow axis 204. Fast axis 200 is associated with a first divergent emission angle 202 that is typically around 45°. Slow axis 204 is associated with a second divergent emission angle 206 that is typically around 10°. The first and second divergent emission angles 202 and 206 may be larger or smaller depending upon the type and design of the laser light source 102. The present invention takes advantage of these divergent emission angles 202 and 206 to spatially expand the light source's emission pattern without requiring additional optics commonly found in other designs.

Other types of light sources 102 emitting divergent light at other wavelengths may be used within the scope of the present invention. Fiber optics and lenses may also be used. Also, various colors of LEDs may be used. For example, the light source 102 may emit a visible red light for use in a taillight application. What is valuable is that the emission pattern is divergent so that it spatially expands as the light moves away from the light source 102.

Figure 3:
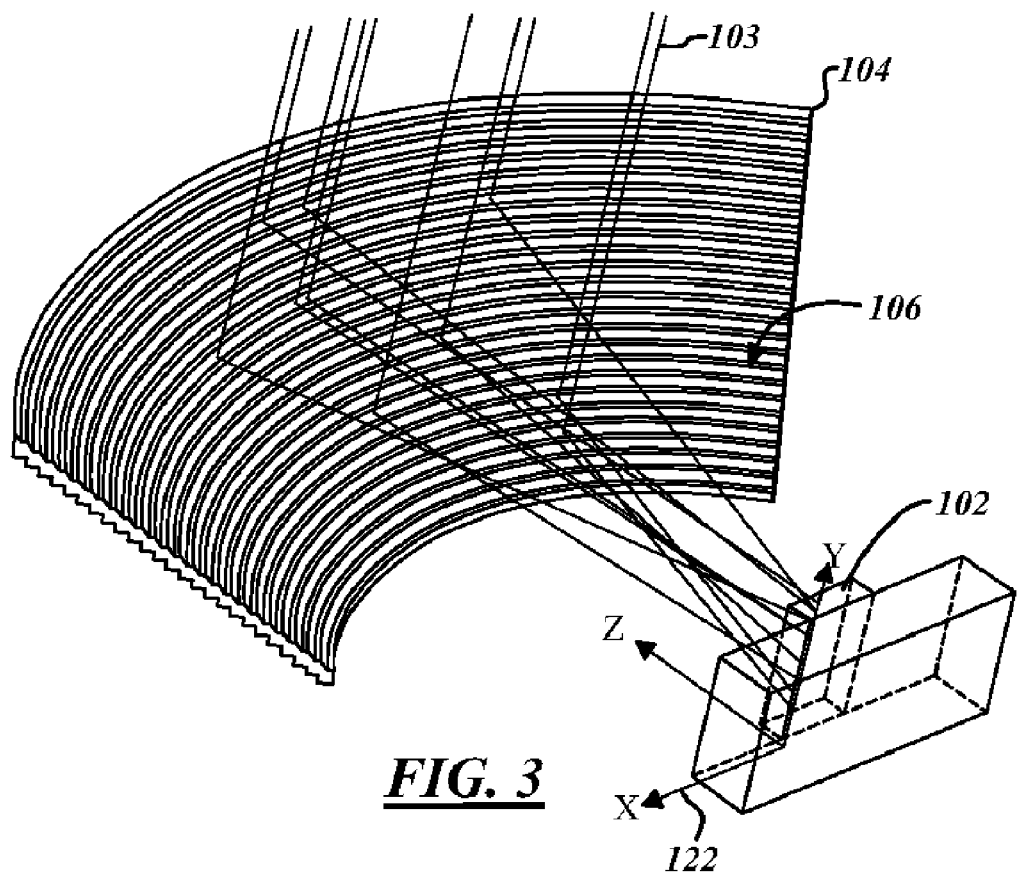
FIG. 3 is a perspective view of a fan optic according to the present invention.

Referring now to FIG. 3, a linear light source 102 is illustrated relative to the optical element 104. As is illustrated, various light rays 103 emanate from the linear light source. In the view illustrated, the fast access of the diode laser fight is evident. That is, as the tight from the linear light source 102 approaches the optical element 104, the light spreads to illuminate an area across the optical element 104. A coordinate system 122 is illustrated having an x-axis, a y-axis and a z-axis. The light source 102 is a linear light source disposed upon the y-axis in the vertical direction. The light rays 103 from the light source travel so that the y-z plane defines the central planar axis of the system. In the constructed embodiment, an equal amount of light from the laser light source appears on both sides of y-z plane.

Figure 4:
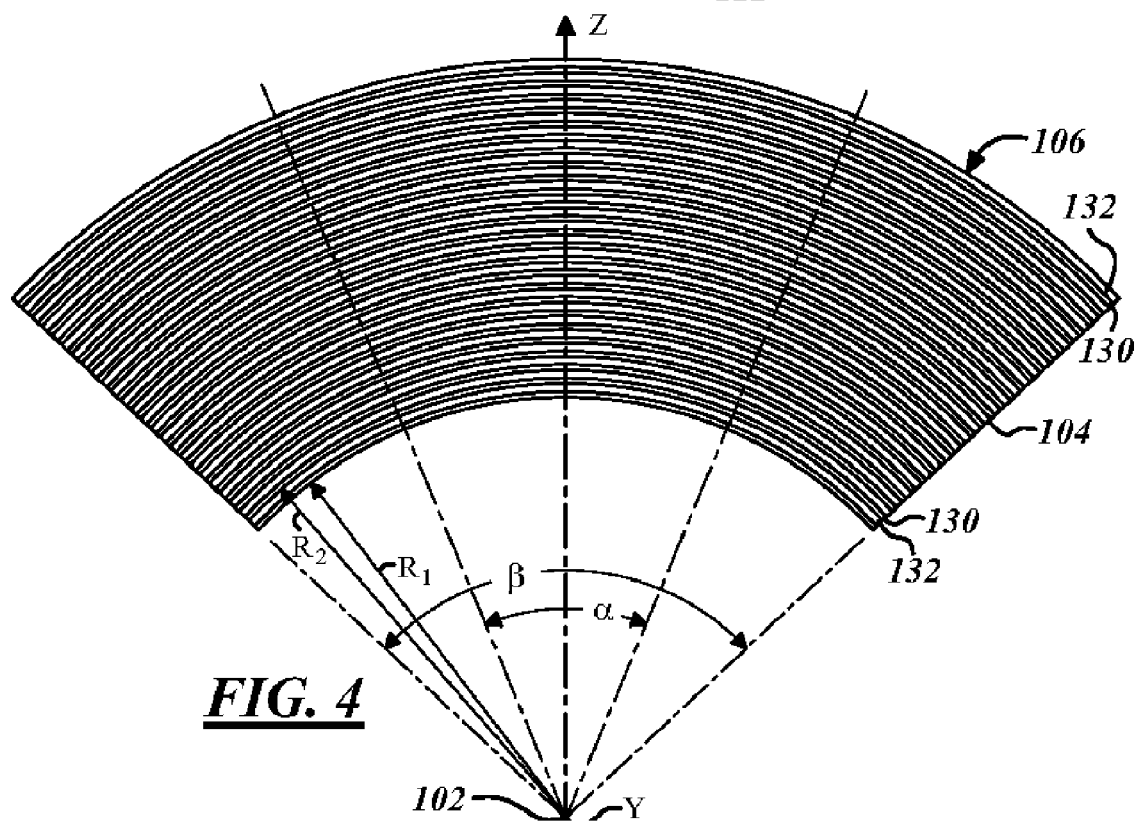
FIG. 4 is a top view of the fan optic of FIG. 3.

Referring now to FIG. 4, a vertical view looking down upon the y-axis at light source 102 is illustrated relative to the z-axis. The fast axis spreads light toward the optical element 104. As mentioned above, an emission angle α of the fast axis may be approximately 45°. The angle β corresponds to an angle of about 90°. Since some light extends beyond the fast axis during emission. Therefore, more light may be reflected from the optical element 104. The sector β defined by the optical element 104 is about 90°. Of course, the angle may be adjusted based upon the characteristics of the output of the light source used. It should also be noted that various optics including lenses may be used for the light source. This includes the use of fiber optics as the light source. Looking in the y direction upon the optical element 104, the reflective surface 106 is illustrated having step surfaces 130 and reflecting surfaces 132. The reflecting surfaces 132 are designed to reflect light from the light source 102 whereas the step surfaces 130 preferably reflect no light from the light source 102. Of course, some light may be incidentally reflected due to imperfections in practical applications.

Each of the reflecting surfaces 130 and 132 have an increasing radius $R_1$, $R_2$, respectively, as the distance from the light source increases. That is, adjacent reflecting surfaces and step surfaces have increasing radii that vary as function of the distance from the light source 102. To state it in another way, as the vertical direction from the origin of the x, y, z-axis increases in the y direction, the radius of the reflecting surfaces increases.

Figure 5:
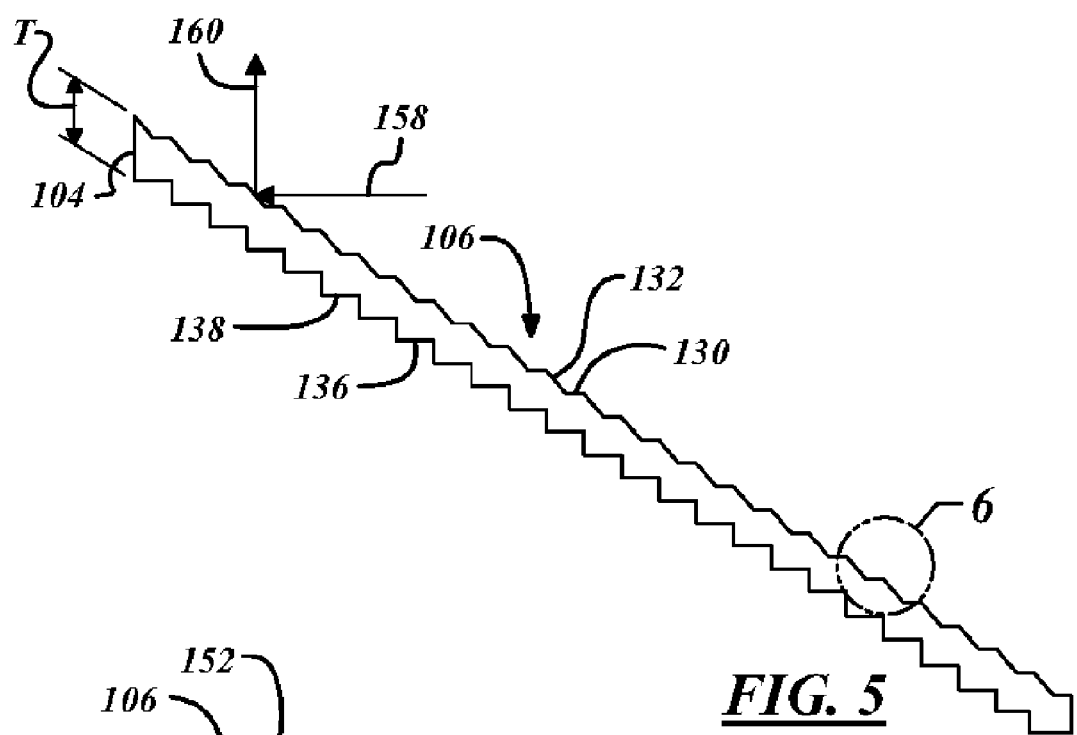
FIG. 5 is a cross-sectional view of the optical element of FIG. 3.

Referring now to FIG. 5, the reflective surface 106 is illustrated in further detail. The reflective surface 106 has reflecting surfaces 132 and step surfaces 130. As mentioned above, the reflecting surfaces 132 reflect the light from the light source 102 whereas the step surfaces 130 preferably do not have light from the light source 102 impinging thereon. The rear side 136 of the optical element 104 is preferably stepped with steps 138 to provide a generally constant thickness T for the optical element 104. By maintaining a relatively thin part, the optical element 104 may be easily molded. Of course, various other shapes besides steps may be formed on the rear side or surface 136. As is shown, a light ray 158 is incident upon the reflecting surface 132, preferably at an angle parallel to the step surface 130. Because of this angle, the angle formed between the incident light ray 158 and the reflected light ray 160 is about 90°.

Figure 6:
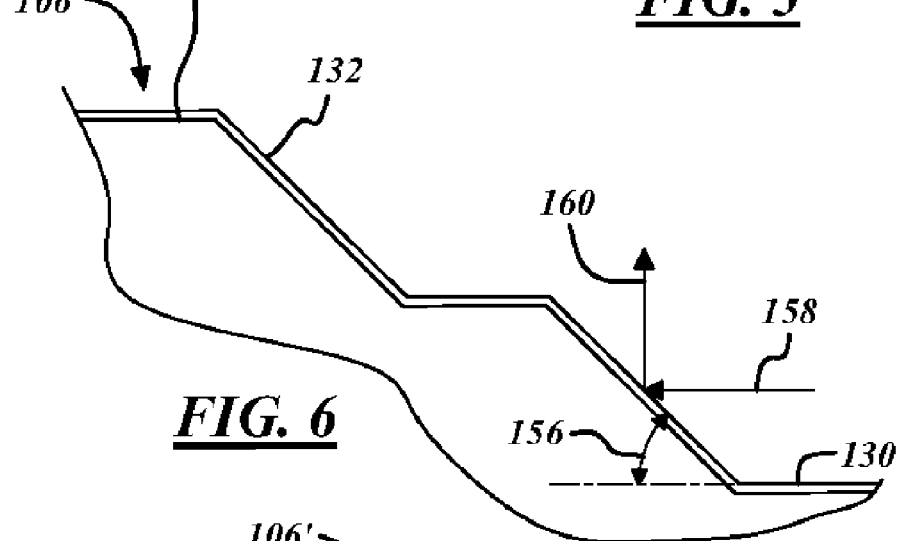
FIG. 6 is an enlarged view of the reflective surface 106.

Referring now to FIG. 6, a cross-sectional view of a portion of the reflective surface 106 is illustrated. The reflective surface 106 has a coating 152 disposed thereon. The coating 152 may be made from various metalized materials such as silver, gold, aluminum, or the like. The metalized surface is preferably reflective in the wavelength of light for the desired application. For a night vision application, near infrared wavelength reflectivity is desired. The near infrared region of the electromagnetic spectrum is about 800 to 940 nanometers (nm). As illustrated in FIG. 6, the angle 156 formed between the inward extension of a step surface 130 (shown as a dashed line) and an adjacent reflecting surface 132 is 45°. The supplementary angle to this is 135°. As is shown, a light ray 158 is incident upon the reflecting surface 132, preferably at an angle parallel to the step surface 130. Because of this angle, the angle formed between the incident light ray 158 and the reflected light ray 160 is about 90°.

Figure 7:
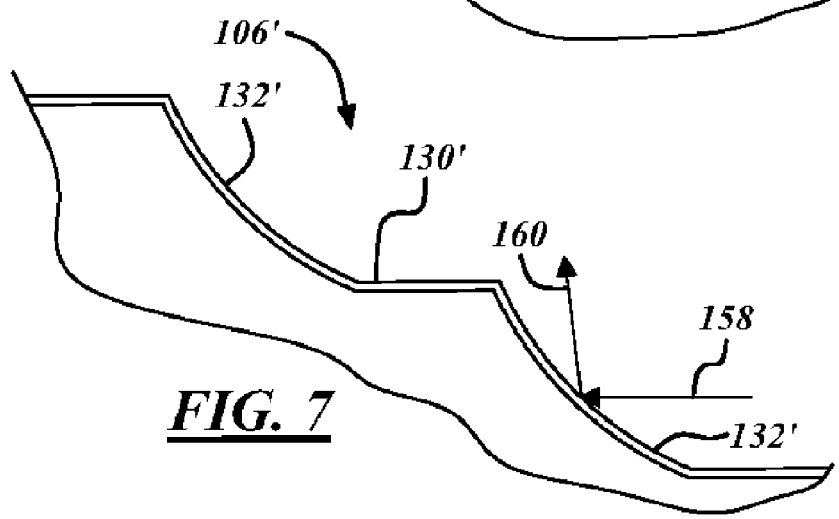
FIG. 7 is an enlarged view of an alternative embodiment of reflecting surface 106'.

Referring now to FIG. 7, an alternative embodiment to that shown in FIG. 6 is illustrated. In this alternative embodiment, a reflective surface 106' includes steps 130', which are formed in a manner similar to those described above. However, the reflecting surfaces 132' of the surface 106' have a curved surface thereon. In the above embodiments, it was desired to provide a collimated light source. In the embodiment shown in FIG. 7, various types of reflection may be produced using various shapes such as the curved shape of the reflecting surface 132'. The shapes may be determined as desired and may thus include parabolic, hyperbolic, elliptical, or other cross-sections to obtain a desired light output for the device. Incident light ray 158 is illustrated with light ray 160 being reflected at an angle greater than 90° due to the curved shape of reflecting surface 132'.

As can be seen in the above embodiments, a monolithic optical element 104 may be formed in various ways to provide a reliably manufactured device. Silvering or metalizing may be used on the reflecting surfaces 132 as well as on the step surfaces 130. Of course, if selective manufacturing processes are used, the reflecting surfaces 132 may then be the only surfaces coated with metalized material.

While particular embodiments of the invention have been shown and described, numerous variations and alternate embodiments will occur to those skilled in the art. Accordingly, it is intended that the invention be limited only in terms of the appended claims.

What is claimed is:

1. An optical structure comprising:
   a monolithic structure having a stepped surface that includes reflective surfaces and step surfaces, said reflective surfaces having a metalized coating thereon so as to externally reflect light from an exterior light source;
   wherein each of said reflective surfaces is a circular sector, and each said circular sector increases in radius from an adjacent circular sector as a function of distance away from said light source.

2. An optical structure as recited in claim 1, wherein said light externally reflected from said plurality of reflective surfaces is collimated.

3. An optical structure comprising:
   a monolithic structure having a stepped surface that includes a plurality of reflective surfaces and step surfaces, said reflective surfaces having a metalized coating thereon so that only the plurality of metalized surface facets reflect light from a light source;
   wherein each of said reflective surfaces is a circular sector;
   wherein each said circular sector increases in radius from an adjacent circular sector; and
   wherein said monolithic structure has a stepped rear surface so as to maintain a generally constant thickness.

4. An optical system comprising:
   a light source disposed in a line and operable to generate light; and
   an optical element having a stepped surface that includes reflective surfaces and step surfaces, said reflective surfaces having a metalized coating thereon so that said reflective surfaces externally reflect said light;
   wherein each of said reflective surfaces is a circular sector, and said reflective surfaces increase in radius from an adjacent circular sector as a function of distance away from said light source.

5. An optical system as recited in claim 4, wherein said light externally reflected from said reflective surfaces is collimated.

6. An optical system as recited in claim 4, wherein said light externally reflected from said reflective surfaces is collimated in a direction parallel to said line.

7. An optical system as recited in claim 4, wherein said light source includes a laser diode.

8. An optical system as recited in claim 4, wherein said light source includes a linear laser diode array.

9. An optical system as recited in claim 4, wherein said light source includes an infrared light source.

10. An optical system as recited in claim 4, wherein said optical element comprises a monolithic structure.

11. An optical system comprising:
    a light source disposed in a line and operable to generate light; and
    an optical element having a stepped surface that includes a plurality of reflective surfaces and step surfaces, said reflective surfaces having a metalized coating thereon so that said plurality of reflective surfaces reflect said light;
    wherein each of said reflective surfaces is a circular sector;
    wherein said plurality of reflective surfaces increases in radius from an adjacent circular sector; and
    wherein said light source has an associated fast axis, and said optical element circumscribes an arc greater than said fast axis.

12. An optical system comprising:
    a light source disposed in a line and operable to generate light; and
    an optical element having a stepped surface that includes a plurality of reflective surfaces and step surfaces, said reflective surfaces having a metalized coating thereon so that said plurality of reflective surfaces reflect said light;
    wherein each of said reflective surfaces is a circular sector;
    wherein said plurality of reflective surfaces increases in radius from an adjacent circular sector; and
    wherein said optical element has a stepped rear surface so as to maintain a generally constant thickness.

13. An optical system as recited in claim 4, wherein said radius increases as said distance from said light source increases.

14. A night vision system comprising:
    an infrared light source;
    an optical element having a stepped surface that includes reflective surfaces and step surfaces, said reflective surfaces having a metalized coating thereon so that said reflective surfaces externally reflect light, wherein each of said reflective surfaces is a circular sector, and each said circular sector increases in radius from an adjacent circular sector as a function of distance away from said infrared light source;
    a camera for receiving infrared light reflected from an object illuminated by said infrared light source and accordingly generating an output signal; and
    a display for receiving said output signal and displaying said object.

15. A night vision system as recited in claim 14, wherein said infrared light source includes a laser diode.

16. A night vision system as recited in claim 14, wherein said infrared light source includes a laser diode array.

17. A night vision system as recited in claim 14, wherein said night vision system further comprises a diffuser.

18. A night vision system as recited in claim 14, wherein said night vision system further comprises a filter for filtering said infrared light reflected from said object.

19. A night vision system as recited in claim 14, wherein said optical element comprises a monolithic structure.

20. A night vision system as recited in claim 19, wherein said monolithic structure has a stepped rear surface so as to maintain a substantially constant thickness.

* * * * *